United States Patent Office 2,929,734
Patented Mar. 22, 1960

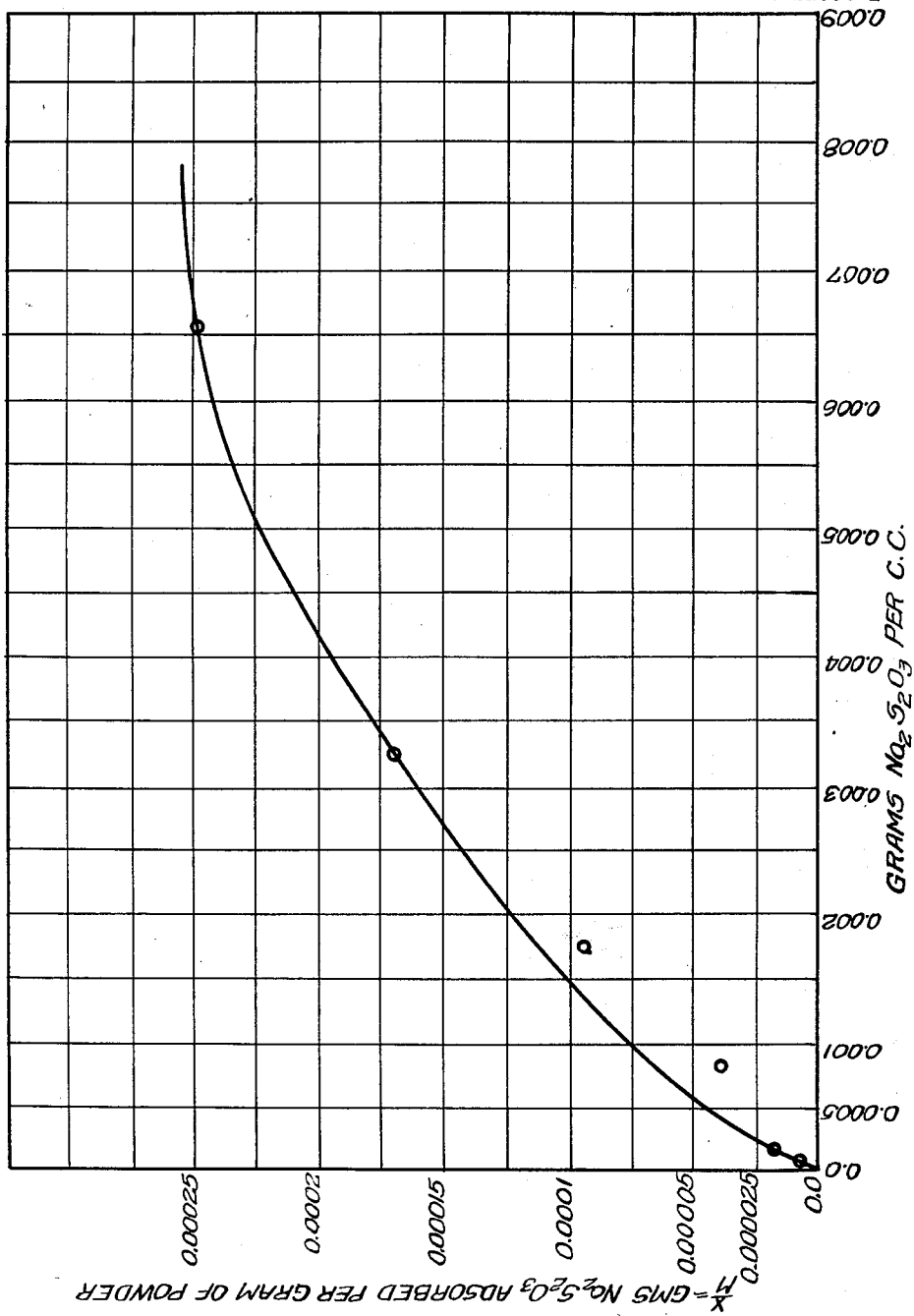

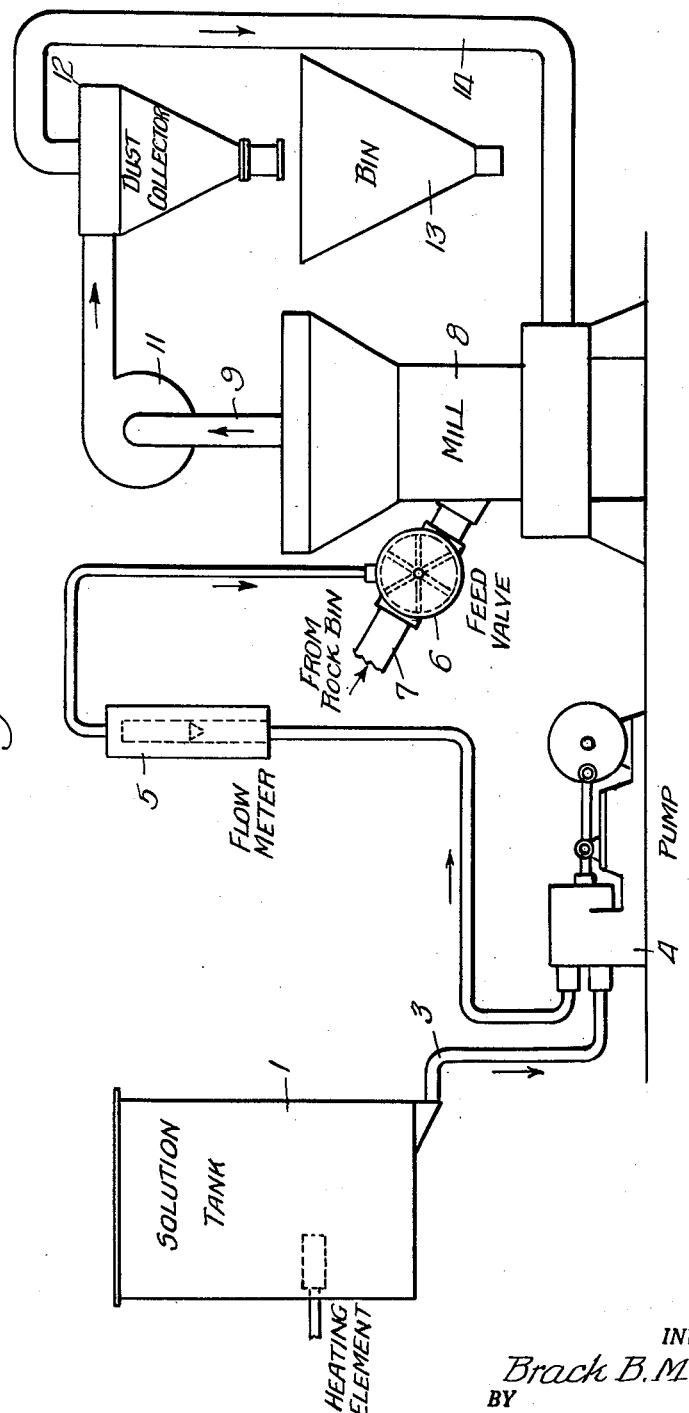

2,929,734

PUTTY POWDERS AND PUTTY COMPOSITIONS MADE THEREFROM

Brack B. McHan, Quincy, Ill., assignor to Calcium Carbonate Company, Chicago, Ill., a corporation of Illinois Application April 3, 1956, Serial No. 575,861

7 Claims. (Cl. 106—260)

The present invention relates to improved putty, caulking and glazing compounds and other putty-like products exhibiting highly desirable properties including a high degree of plasticity, better working qualities, improved wearing qualities, improved keeping qualities and less oil requirements. More specifically, the present invention is directed to new and improved pulverized limestone powders having improved physical properties from which putty and putty-like products having the aforementioned improved properties can be manufactured.

Putties, caulking and glazing compounds must have certain definite physical characteristics in order to meet the requirements of application to the glass, wood and metal sash. They must be of such consistency that they can be easily and properly applied by the glazier, either by hand or by gun. In order to meet these requirements they must have the proper body consistency, plastic flow and adhesion. The desirable properties can be partially developed by the oil and vehicles used to produce the putty. However, to produce putties, caulking and glazing compounds having the desirable and necessary properties the powder, which usually constitutes approximately 75% to 85% by weight of the finished product, must also have the inherent property of developing the required degree of plastic flow and cohesion and adhesion. The powder must, also, develop these required physical properties with a wide range of oils and other vehicles commonly used in formulating products in this category.

Putty powders are commonly made from three sources of stone. In the past the most general source of putty powders was English chalk or other imported chalk whiting. Many putties were produced by the use of nothing more than linseed oil and imported whiting. Later this practice was changed and highly modified by the use of crystalline ground limestones in which was incorporated from 20% to 40% of chalk whiting. The use of a pure chalk whiting powder produced a putty having a very high oil absorption which was extremely long and sticky, difficult to apply and did not give satisfactory wearing performance on the sash. The use of a modified product consisting of a portion of crystalline ground limestone along with a moderate percentage of English chalk produced powders of a sufficient degree of plasticity and adhesion that were much more easily applied to the sash, in many cases with actually superior wearing and performance qualities. Also, less oil was required by the combined chalk and limestone powder.

The use of chalk has largely been abandoned in the last few years and has been replaced in the United States particularly by powders produced from selected limestones. The production of suitable powders from limestones requires grinding and sizing under rigid control. Ground limestone powders are now produced in a wide range of particle size distribution to meet the requirements of the various grades and classes of putties, caulking and glazing compounds.

Limestones suitable for the production of putty powders are found in three varieties, i.e., crystalline, crypto-crystalline and oolitic. Marble is also used for this purpose and is classified mineralogically with the crystalline limestones. The morphological characteristics of the crystalline limestones are greatly varied. E. S. Dana, in his "System of Mineralogy," illustrates 39 forms of the calcite crystal. In this same book oolitic limestone is defined as a granular limestone "but its grains are minute rounded concretions, looking somewhat like the roe of fish. The concretionary grains will range in size from minute, almost microscopic sized spheroids to pieces as large as a pea."

The oolitic stone giving the most satisfactory powders for use in putty, caulking and glazing compounds is made from those containing relatively small round concretionary structures that are macroscopic in size and can just be well seen with the unaided eye. This type of limestone, when properly ground, produces a putty having the required degree of plastic flow. With pure raw linseed oil they produce putties that have a long tenacious string and high degree of adhesion and extraordinarily good working properties and wearing quality. Unfortunately, the extent of oolitic deposits suitable for the production of putty powders is severely limited. Only a few deposits have been discovered and at present only one is being worked for this purpose in the United States.

There are many deposits of crystalline limestone of a high degree or purity and having satisfactory color or whiteness from which suitable putty powders could be produced if the proper degree of plastic flow and other desirable properties could be developed in these powders. Powders produced from crystalline stones are usually characterized by a short and mealy type of plastic flow and a lack of adhesion and internal cohesion. They are inclined to be mealy and work very poorly when applied in putty form to the sash by the glazier. Such putties often do not have the required degree of suspension and are inclined to settle badly in the container during storage, much of the oil separating and rising to the top and the powder settling to a hard cake in the bottom.

Putties, caulking and glazing compounds must meet the demands of service. Caulking compounds must remain soft and plastic with perfect adherence to the building material, be it either steel, brick, stone, or concrete. After being applied, the oil must not separate and stain the building. These compounds must stand up in actual service for a reasonable period without deterioration from weathering influence. They must not chip, crack, or peel permitting the entry of water into the wood or steel sash or around the crevices in the building structure.

One of the commonly used methods for developing the required degree of plastic flow and plasticity from crystalline powders depends on the use of a moderately large percentage of heavy bodied blown or heavy kettle bodied drying oils. These generally have a viscosity of Z–2 to Z–6 and are quite expensive in comparison with the straight raw oils or clarified oils. Most putty formulas today that are based on crystalline powders are made with the vehicle portion containing anywhere from 20% to 40% of one of the specially treated heavy bodied oils in order to develop the required degree of plastic flow and suspension quality. Typical formulas are:

VEHICLE PORTION

| | Percent |
|---|---|
| Polymerized oil (linseed or soya, heat bodied or blown, viscosity Z–4) | 71.0 |
| Mineral seal oil | 12.5 |
| Oleum spirits | 12.5 |
| Fatty acids of linseed oil | 2.0 |
| Dryer | 2.0 | or

| | |
|---|---|
| Polymerized oil (linseed or soya, heat bodied, or blown, viscosity Z-4) | 30-60 |
| Raw oil (clarified or degummed linseed or soya) | 56-26 |
| Mineral seal oil | 5.0 |
| Oleum spirits | 5.0 |
| Fatty acids of linseed oil | 2.0 |
| Dryer | 2.0 |

These are quite expensive oil formulas. In the very wide application of huge quantities of these products additional items of expense constitute a serious consideration. The extra expense incurred in the use of the special oils very often prevents the development, application and use of desirable products, where in many cases it would be a real contribution to certain phases of present day industrial arts.

The heavy bodied oils referred to may be either blown oils or heat bodied oils. Blown oils are drying oils through which finely divided bubbles of air have been padded at moderate temperatures for a considerable period of time. This causes the oil to oxidize and increases the viscosity. If the blowing is continued long enough the oil finally forms a solid jell. Heat bodied oils are drying oils that have been heated to temperatures of from about 525 to 625° F. until they gradually thicken to highly viscous amber color liquids. As in the blown oils the viscosity increases substantially as the heating process is continued. These two treatments produce what are known in the trade as heavy bodied oils. The common method of describing their degree of thickness or heaviness produced by either the blowing or the heat treating process is by means of some symbol which indicates the degree of viscosity.

All fluid possesses a definite resistance to flow. The degree of this resistance is known as the viscosity. It is expressed usually as poises or centipoises. Various methods for the measurement of the resistance to flow under accurately controlled conditions have been devised. One of the methods commonly used by the paint and putty manufacturers is what is known as the Gardner-Holdt method. This consists of a number of tubes, holding liquids of varying degrees of viscosity, which have been previously accurately determined, in which an air bubble is trapped. The time that it takes the bubble to travel from the bottom to the top of the tube upon reversing the tube gives the result in poises which can in turn be designated by the letter or symbol used to designate that particular viscosity. As an example of the heavy bodies, standard viscosity series from U to Z-6 are shown in the following table:

HEAVY BODY VISCOSITY STANDARDS

| | |
|---|---|
| U | 6.27 |
| V | 8.84 |
| W | 10.70 |
| X | 12.9 |
| Y | 17.6 |
| Z | 22.7 |
| Z1 | 27.0 |
| Z2 | 36.2 |
| Z3 | 46.3 |
| Z4 | 63.4 |
| Z5 | 98.5 |
| Z6 | 148. |

The heavy bodied oils in the vehicle formulas have the very peculiar property of being preferentially adsorbed over the surface of the calcium carbonate particles. In this condition they exert a very peculiar type of surface attraction that causes the particles to aggregate in definite types of aggregated structure in the form of long, rod-type aggregates, which gradually bend and become circular in form. These can be easily seen on microscopic examination. This type of structure of the aggregated powder particles, due to the adsorption of the heavy bodied oil, lends to the putty the property of long plasticity and the required degree of adhesion and cohesion. Due to the development of these properties, the resultant product, also, has extraordinarily good suspension. That is, the structure causes the oil to be retained in the interstices and voids around this structure forming an integral web throughout the contents of a container. This structure is, also, of great importance in its industrial usage. Such putties do not leak or ooze oil after being applied on the sash or other building surface on which they are used. After being applied they immediately set to a very rigid type of structure which remains in this condition through many years of service.

Keeping qualities of the putty in the original package is of great importance. Putty often stands in the original container for several months before use. If the product does not have good keeping quality it will separate and settle to a hard mass at the bottom of the container with most of the oil on top. Often the solids at the bottom will harden to a consistency that is impossible to remove by hand and, as a consequence, reworking on the job becomes impossible.

Plastic flow is defined as the flow in which the rate of shear is proportional to the shearing stress in excess of yield value. This type of flow of plastic putties may vary from a mealy granular condition that does not possess any apparent flow or string to a putty mass of extremely long, smooth, easy plastic flow. All gradations of plastic flow are possible between these extremes. There are certain types of plastic flow that may be defined roughly and practically as follows: "Mealy" generally means a putty without very much string or flow. When pulled it breaks into a short mealy mass and does not hold together. It has a very low internal cohesion. "Short" describes the plastic flow that breaks before it can be pulled to any considerable length. When mixed and pulled in the hands it breaks with a short brittle mealy fracture on folding. This type of flow is usually slightly better than the mealy condition. "Long" describes the flow of a putty that can be easily pulled into a long string before breaking. Such putties can be pulled in the hands and bent over and over without breaking. There are, also, certain definite types of plastic flow, such as "buttery" which means a buttery-like consistency with a short plastic flow, pinching out to a short buttery fracture. "Thixotropic" means a putty that sets up to a uniform, often stiff, non-plastic body. This consistency will usually break on working and the original plasticity is restored. Thixotropic characteristics may vary from a very short hard cement-like set to a thin buttery jelly-like set.

In order that putties may possess the proper working characteristics in application and service, the plastic flow will usually fall in the semi-short to the semi-long range. Putties must also have enough internal cohesion to be pulled readily with the hands and bent over and over without breaking. Such physical characteristics are necessary for proper working by the glazier and determine, to a large degree, the ease of the mechanical application to the sash, be it either metal or wood.

In order for putties and caulking compounds to possess the proper working and service characteristics, it is necessary that they have the proper degree of adhesion. By adhesion is meant the tendency or power of putty to adhere to the surface with which it comes in contact. The adhesion must be low enough that it can be easily handled and applied by the glazier, i.e., without sticking to the hands so badly that it cannot be easily worked. The adhesion must also be high enough that it gives firm adherence of the putty mass to the wood and glass and as it dries forming a perfect union and water-tight bond between putty and the wood, glass or metal as the case may be.

A putty may have a very high degree of adhesion and yet have such a low plastic flow that it is impossible to use it. It may, also, have an extremely high plastic flow and such a low adhesion that it does not form a good bond between the wood and glass.

Suspension in the can, as explained above, is an important characteristic from the standpoint of keeping quality; particularly with those putties that may be retained on the dealers' shelves over comparatively long periods of time before they are used. The condition of the putty in the can after standing may vary through a wide range of conditions, dependent upon the type of powder and vehicle from which it was made. A perfect keeping putty is one which is just as soft after standing several months as it was when it was put in the can. When removed it is uniformly soft from the top to the bottom of the container and of nearly the same consistency as when placed in the can. The other extreme is represented by the type of putty in which the powder separates from the oil, settling in the bottom of the container to a hard rock-like mass, with the separated oil on top. The powder often sets up to such a hard rock-like mass that it is impossible to remove except with a sharp tool. Such putties, after standing for some time, are valueless until they are completely reworked.

After being applied to the sash, either metal or wood, the putty must remain in position and even withstand a reasonable amount of mechanical shock before the putty has dried. This means that the body consistency must possess a sufficient degree of rigidity and have a high yield value. It must also have a sufficient amount of resistance to plastic flow, so that the putty will remain in position after being appled to the sash.

Putty powders that do not have the correct micron size distribution, or particle size range often allow the oil or vehicle to separate from the putty after it has been applied to the sash. In extreme cases the oil will separate in sufficient quantity to run down the sash.

The oil absorption is the amount of oil required to produce a putty of the correct working characteristics. It is usually defined as the amount of oil required for 100 pounds of powder. Oil absorptions may vary from a low of 8 or 9 pounds of oil per 100 pounds of powder up to a high of 25 or 30 pounds of oil per 100 pounds of powder. In the production of commercial putties, oil absorption is highly important from the economic standpoint. If a putty maker is using a powder having an oil absorption of 11 and he then secures one with an oil absorption of 12, it means that he must use 20 pounds more of oil for every ton of powder. This is approximately 3 to 3½ gallons of oil at a cost of approximately 3 to 6 dollars extra on each ton of powder. It is, therefore, very important that oil absorption be controlled within comparatively narrow limits.

In addition to the use of putty powders having the required degree of plastic quality that is typical of oolitic limestone, there should be added another method that was in common use in the past and is to some extent used today. This is the use of English chalk. By using moderate percentages of English chalk or imported chalks in the range of usually 20% to 30%, combined with a crystalline limestone powder, a putty having a high degree of plastic flow and extraordinarily good qualities can be produced.

Also, very acceptable putty powders can be produced by extremely fine grinding of crystalline limestones. If a portion of the powder constituting the putty powder formula is ground to an average of 2 or 3 microns, having a micron size distribution in which about 50% or 60% is smaller than 1 micron, then a very high degree of plasticity will, also, be developed. To produce the required and acceptable degree of plastic quality that is required for putties, caulking and glazing compounds, there are then four alternate formulations: (1) those based on oolitic limestones; (2) those based on natural chalk plus crystalline limestones; (3) those containing 20% to 40% of very fine ground crystalline limestone plus coarser crystalline limestone powder; and (4) those containing relatively high percentages of heavy bodied oils in the vehicle portion.

All of these procedures have a common objection. They are costly as compared to the powders that can be ground and produced from crystalline limestones. The oolitic limestones, as previously mentioned, exist in only one or two localities. For places remote from these points, this involves high shipping cost. In the case of those depending upon the use of chalk, war or any other disturbing world condition can shut off the source of supply. The present cost of importing is also excessive. In the case of the very fine grinding, the cost of grinding the 20% to 40% portion of the powder is extremely high, resulting in a high cost for the powder formula. Also, drying oils of the type described are costly when used in any appreciable quantities in the vehicle portion of putty compounds.

The greatest objection to powders produced from crystalline limestones in comparison to any one of the four foregoing acceptable methods, is the rather common lack of the proper degree of plasticity and plastic flow and the inclination to settle in the package after the product has been stored.

It is therefore an object of the present invention to provide a putty exhibiting improved physical properties such as greater plasticity, better working qualities, improved wearing qualities, improved keeping qualities and less oil requirements while using as a powder base therefor treated pulverized crystalline limestone rock.

Still another object is to provide an improved crystalline limestone powder exhibiting improved physical properties suitable for use in the manufacture of putty without requiring mixture with special powders, specialized fine grinding or special oil vehicles.

A further object is to provide a method of treating pulverized crystalline limestone to improve the physical properties of the powder to allow its use in the production of a putty of improved physical properties.

Still a further object is to provide a method of producing a putty capable of high efficiency in use, capable of maintaining highly desirable properties during protracted use or storage and requiring less combined oil in its manufacture.

Another object is to provide a series of compounds which can be suitably combined with pulverized limestone to improve the physical properties of the limestone and impart improved properties to putty when the treated limestone is incorporated in the manufacture thereof.

Other objects not specifically set forth will become apparent from the following detailed description.

In the drawings:

Fig. 1 is a coordinate chart setting forth a curve which represents the variation in adsorption of sodium thiosulfate with increased concentrations of sodium thiosulfate; and Fig. 2 is a flow sheet setting forth a preferred method of forming the powder of the present invention.

As stated above, limestone is capable of producing sufficiently fine powders for use in the manufacture of putty. Normally, crystalline limestone has not been found suitable for this purpose due to its physical properties which, when present in a putty composition, impart undesirable properties to the putty. Table I sets forth typical examples of the size range of putty powders. In this table, three grades of limestone powders are shown to illustrate the degrees of fineness available upon the pulverization of limestone. The nomenclature used in identifying the grades (G, No. 3 SPP and C) is known in the art.

Table I

|  | G | No. 3 SPP | C |
|---|---|---|---|
|  | *Percent* | *Percent* | *Percent* |
| Screen Analysis (Cum. Percent Thru): |  |  |  |
| 100 Mesh 0.0058 in. opening | 99.999 | 99.03 | 99.865 |
| 200 Mesh 0.0029 in. opening | 99.998 | 84.75 | 93.090 |
| 325 Mesh 0.0017 in. opening | 99.985 | 69.30 | 77.335 |
| Micron Size Distribution: |  |  |  |
| Plus 25 Microns | 5.5 | 47.2 | 35.0 |
| 10 to 25 Microns | 24.5 | 23.1 | 17.3 |
| 5 to 10 Microns | 25.1 | 13.4 | 13.0 |
| 1 to 5 Microns | 35.4 | 15.3 | 34.0 |
| Minus 1 Micron | 9.5 | 1.0 | 0.7 |

Of the different grades shown in Table I, grade G is of the type exhibiting the greatest percentage of fines. Generally speaking, putty powder formulations made with such powders having a high percentage of particles of a size less than five microns produce putties of remarkably long flow and very satisfactory working and glazing characteristics. Such putties usually exhibit good keeping qualities. A common practice is to combine from 20% to 50% of fine powder with 50% to 80% of a coarser powder. Such powder combinations normally produce satisfactory putties. An example of such a combination is a powder formed from 80% No. 3 SPP powder and 20% G powder set forth in Table I. As stated above, however, when coarser powders produced from crystalline limestone are incorporated alone in a putty product, the resultant product is too short and mealy. However, by treating such powders in accordance with the teachings of my invention, the physical characteristics of the coarsely pulverized limestone are so greatly altered as to allow its incorporation into a putty product which in turn will exhibit highly improved physical properties.

I have found that by treatment of crystalline limestone powders with sodium thiosulfate, rosin, benzoic acid or heavy bodied highly viscous drying oils such as linseed oils, soya oils or fish oils, which have been blown or heat-treated or any combinations of the aforementioned compounds, the powders, when incorporated in the manufacture of putty, impart to the putty greatly improved physical properties. Such putties exhibit a high degree of internal cohesion allowing much easier application and manipulation in the hands of the glazier and also exhibit nonsettling characteristics which allow almost indefinite storage. For example, Table II sets forth samples of putties made from four different powders, two of which were treated with sodium thiosulfate alone and two of which were treated with sodium thiosulfate and a rosin, namely, W-2 resin. Also included in Table II are putties produced from untreated powders for comparison purposes. In each instance the vehicle used in the putty formulation is raw linseed oil which is the most commonly used vehicle in the industry.

Table II

| Powder | Surface Treatment | Vehicle | Oil Absorption, Lbs. | Standing Time, Years | Oil Separation | Condition After Standing |
|---|---|---|---|---|---|---|
| L | None | Raw Linseed Oil | 14.94 | 1 | Yes | Lumpy-bottom ½ dry, mealy-hard. |
| L | 0.47% Na$_2$S$_2$O$_3$.5H$_2$O / 0.2% W-2 Resin | Raw Linseed Oil | 11.97 | 1 | None | Semi-plastic. Easily reworked. Fair condition. |
|  |  | Difference | 2.97 |  |  |  |
| C | None | Raw Linseed Oil | 11.93 | 1 | Yes | Firm, hard, solid, poor condition. |
| C | 0.32% Na$_2$S$_2$O$_3$.5H$_2$O | Raw Linseed Oil | 10.77 | 1 | Slight | Semi-plastic. Fair condition. |
|  |  | Difference | 1.16 |  |  |  |
| G | None | Raw Linseed Oil | 14.18 | 1 | Yes | Progressive stiffening to bottom. Poor condition. |
| G | 0.47% Na$_2$S$_2$O$_3$.5HSO / 0.30% W-2 Resin | Raw Linseed Oil | 10.87 | 1 | Slight | No settling. About same as when put in can. |
|  |  | Difference | 3.31 |  |  |  |
| No. 3 SPP | None | Raw Linseed Oil | 12.61 | 1 | Yes | Dry and mealy throughout. Poor condition. |
| No. 3 SPP | 0.01% Na$_2$S$_2$O$_3$.5H$_2$O | Raw Linseed Oil | 11.82 | 1 | Slight | Soft and plastic. Fair condition. |
|  |  | Difference | 0.79 |  |  |  |

In referring to Table II it is interesting to note that the oil absorption varies considerably between the untreated powder and the treated powder. In every instance the amount of oil required per 100 pounds of powder is considerably reduced by the treatment of my invention. Oil absorption varies from 0.79 pound of oil for 100 pounds of powder to 3.31 pounds of oil for 100 pounds of powder. In the case of the coarser No. 3 SPP powder, the untreated sample required 15.8 pounds of extra oil to produce putty from one ton of the powder as compared to the treated powder. Using these figures, the saving in oil would amount to approximately 2 gallons and, at its present market price, this would amount to a savings of from 2 to 4 dollars per ton of putty. The feature of reduced oil requirements is further borne out by the results obtained in connection with the G powder. Here there is a savings of roughly 9 gallons which would amount to a dollar savings of from 9 dollars to 27 dollars per ton of product.

Another important feature which should be noticed from the results in Table II is the condition of the putty following storage for one year. In every case the untreated powders mixed with raw linseed oil to putty consistency and stored in a 10 pound can for one year became firm and hard. These products showed considerable oil separation and were in such a poor condition that it would be necessary to rework them before they could be applied to a sash or building. On the other hand, all of the treated powders resulted in a putty showing a much better condition at the end of one year. None of them were hard and there was very little oil separation. Most of them could be used with a moderate amount of reworking just as they came from the storage can. The same degree of improvement is effected with powders produced from either crystalline or oolitic stone. Powders L and C were produced from oolitic limestone. Powders G and No. 3 SPP were produced from crystalline limestone.

The reduction of oil absorption of the powders that were treated with sodium thiosulfate or with sodium thiosulfate and resin showed that the percentage of oil required to produce a product of the proper putty-like consistency was reduced from 5% to 25%. The average reduction was slightly over 10%. The reduction in the amount of oil required is also probably a function of the surface area of the powder. The coarser powders gave less reduction, running from 5% to 12%. The finer powders gave a high reduction in oil absorption, running from 10% to 25%. It was reasoned that this difference was probably due to surface area.

In order to provide a theoretical basis by which to guide the research work on $Na_2S_2O_3$ and resin treatment of putty powders, it was first decided to investigate the adsorption rate of sodium thiosulfate ($Na_2S_2O_3$) by pulverized limestones. Table IV shows the adsorption of $Na_2S_2O_3$ by a moderately coarse powder which had a screen analyses and particle size distribution set forth in Table III.

*Table III*

Screen analysis:  Cum. thru, percent
- 100 mesh 0.0058 in. opening _____ 98.7810
- 200 mesh 0.0029 in. opening _____ 86.8730
- 325 mesh 0.0017 in. opening _____ 72.7200

Micron size distribution:
- Plus 25 microns _____ 38.3
- 10 to 25 microns _____ 17.0
- 5 to 10 microns _____ 15.1
- 1 to 5 microns _____ 28.4
- Minus 1 micron _____ 1.2 showed an increasing adsorption of the $Na_2S_2O_3$ as a function of solution strength. Column $$\frac{x}{m}$$

of Table IV shows the sodium thiosulfate adsorbed per gram of calcium carbonate at the various solution concentrations. The solution which contained 0.00008208 gram of sodium thiosulfate per cubic centimeter resulted in an adsorption of 0.0000096 gram of sodium thiosulfate per gram of powder. The column $$\frac{x}{m}$$

shows a constantly increasing value in relationship to the constantly increasing strength of sodium thiosulfate solution. These results are plotted on the accompanying drawing in Fig. 1 wherein a coordinate chart and a curve is drawn which conforms very closely the Freundlich adsorption isotherm formula. $Na_2S_2O_3$ solutions of higher strength than No. 10 resulted in a decreased adsorption. The strength of 0.00657 gram $Na_2S_2O_3$ per cc. gave approximately the highest degree of adsorption.

Table V below shows the effect of treating powders with different amounts of sodium thiosulfate. In this experiment the powders were treated with solutions of such a strength as to give the corresponding adsorption of $Na_2S_2O_3$ per gram of powder that would correspond with those taken from the adsorption isotherm experiments. Table V also shows that there was a reduction in oil absorption from 12.34 to 10.91 when only 0.005% of $Na_2S_2O_3$ was used. This is only one-tenth of a pound per ton of powder. The lowest oil absorption was given by 0.025% of $Na_2S_2O_3$ which is equivalent to 0.5 pound of sodium thiosulfate per ton of powder. On the basis of these experiments as well as practical experiments in the application of sodium thiosulfate in the processes of grinding and mixing the critical limit should be set at a low of .0001% and a high of 5.0% based on the weight of the powder. The greatest effect will fall within this bracket and in fact before reaching 5.0% the oil adsorption isotherm will have dropped. That is, the quantity

*Table IV*

| Test No. | Concentration $Na_2S_2O_3$ Sol. Before Adsorption | | Concentration $Na_2S_2O_3$ Sol. After Adsorption | | Quantity Adsorbed by 200 Gms. St- (C-7) Powder | | $\frac{x}{m}$ |
|---|---|---|---|---|---|---|---|
| | Gms. $Na_2S_2O_3$ in 250 cc. | Gms. $Na_2S_2O_3$ Per cc. | Gms. $Na_2S_2O_3$ in 250 cc. | Gms. $Na_2S_2O_3$ Per cc. | Gms. $Na_2S_2O_3$ Adsorbed Total | Gms. $Na_2S_2O_3$ Adsorbed Per Gm. | $Na_2S_2O_3$ Adsorbed Per Gm. |
| 1 | 0.02052 | 0.00008208 | 0.01860 | ---------- | 0.00192 | ---------- | 0.0000096 |
| 3 | 0.04104 | 0.000174 | 0.03720 | ---------- | 0.00384 | ---------- | 0.0000192 |
| 7 | 0.2052 | 0.00082 | 0.19764 | ---------- | 0.00756 | ---------- | 0.0000378 |
| 8 | 0.4104 | 0.00174 | 0.39162 | ---------- | 0.018780 | ---------- | 0.0000939 |
| 9 | 0.8208 | 0.00328 | 0.78690 | ---------- | 0.03390 | ---------- | 0.0001695 |
| 10 | 1.6416 | 0.00657 | 1.59210 | ---------- | 0.04950 | ---------- | 0.0002475 |

The results of treating 200 grams of the powder with $Na_2S_2O_3$ solutions of constantly increasing strength of $Na_2S_2O_3$ adsorbed per gram will have decreased and the oil adsorption will then begin to rise.

*Table V*

| Putty Exp. No. | Gms. $Na_2S_2O_3$ Adsorbed Per Gm. of Powder | Total Gms. Powder Used | Total Gms. $Na_2S_2O_3$ Req'd, Gms. | Percent $Na_2S_2O_3$ | Total $Na_2S_2O_3+$ $5H_2O$ | Vol. Of Sol., cc. | Oil Abs. |
|---|---|---|---|---|---|---|---|
| P7-22-65 | 0.00005 | 4,536 | 0.2268 | 0.005 | 0.356 | 300 | 10.91 |
| P7-22-66 | 0.00015 | 4,536 | 0.6804 | 0.015 | 1.068 | 300 | 10.91 |
| P7-22-67 | 0.00025 | 4,536 | 1.1340 | 0.025 | 1.780 | 300 | 10.76 |
| P7-22-68 | none | 4,536 | none | none | none | none | 12.34 |
| P7-22-69 | none | 4,536 | none | none | none | none | [1] 11.55 |

[1] 0.3% W-2 resin in 200 cc. solvent.

Table V shows the effect on the reduction of oil absorption by treating the powder with 0.3% of W-2 resin dissolved in 200 cc. of solvent. In this case the solvent was naphtha. Resin, whether it be the W-2 or any other grade of normal wood resin, has the effect of reducing the oil absorption to some extent but its most pronounced effect is in its modification of the plastic performance of the powder. A very small percentage of resin introduced onto the surface of the powder considerably increases the plasticity and also the suspension qualities. When this treatment is combined with the sodium thiosulfate surface treatment there is a very pronounced improvement in the physical qualities of the powder. It produces powder with a very low oil absorption, thereby saving from 5% to 25% of the oil normally required by the untreated powder. There is a very definite improvement in the keeping qualities of the powders as shown in Table II. Also the putty has a much higher degree of plasticity. It produces a more dense body with a high and more desirable degree of plasticity and the adhesion value is also considerably improved. The critical range of the rosin treatment is between 0.5% and 5.0%. Between these limits the maximum effects on the physical properties of the putty made from the treated powder is produced. This then would form the critical range of the resin required whether the powder was treated with resin only or a combination of $Na_2S_2O_3$ and resin.

There are two methods by which the powder may be treated. One is to introduce the reagents directly into the mill onto the rock as it is pulverized. In the case of treating with both of these reagents the two reagents would be metered in separately, the sodium thiosulfate in a water solution and the resin in a solvent solution. There is no danger or hazard from explosion with the solvent as the calcuim carbonate dust would inhibit or stop any flame propagation. The treating liquids are metered onto the rock by metering pumps or preferably just inside the mill so that intimate and thorough contact with the reagents is formed with the particles that are produced during the process of grinding. In referring to Fig. 2 of the drawings, there is depicted a schematic arrangement for treating the limestone in accordance with the teachings of the present invention to secure the desired product. The reagent from tank 1 is passed through a line 3 in which is interposed a pump 4 and flow meter 5, to a feed valve 6. The feed valve 6 is located in the conduit 7 which carries the crushed rock up to 2 and 3 inches in diameter from the rock bin to the mill 8. Mill 8 is preferably a ring roll or hammer mill suitable for receiving relatively large pieces of limestone and discharging finely ground material at a high rate of production such as, for example, 5 to 7 tons per hour. Ordinarily the limestone is subjected to the grinding action for only a short time, not over about 1 to 3 minutes and in some instances considerably less than a minute. The treated pulverized rock is withdrawn through the pipe 9 by means of a blower 11 and passes to a dust collector 12. The dust is collected by the collector 12 and the pulverized material passes to a bin 13 while the air carrier is returned to the mill through pipe 14. Treatment apparatus of the type schematically shown can be suitably used in supplying a solution of sodium thiosulfate and a solvent solution of resin to the mill 8 during grinding of the limestone rock. The difference in the instance where more than one reagent is used is that there would have to be sufficient solution tanks and metering pumps provided to introduce each reagent separately.

Careful control must be maintained over the concentration of the sodium thiosulfate solution, as shown by the absorption effects in Table II that occur with a change in the solution concentration. The solution concentration would normally contain from 0.00008 to 0.007 gram of sodium thiosulfate per cc. Expressed in gallons this would be as follows:

Sodium thiosulfate _____ 2.5 lbs.
Water _____ 50.0 gallons.
50 gallons of solution.

The resin is dissolved in xylol, benzine or naphtha or any other suitable solvent or combination thereof, in the general proportion of 10 to 25 grams of the resin to 100 cc. of solvent. As an example, a solution containing 104.25 lbs. resin to 50 gallons solvent contains approximately 25 grams of resin per 100 cc. of solvent. These solutions are then metered onto the rock at a rate that will introduce the quantity of $Na_2S_2O_3$ or resin desired within the critical limits.

Another method of producing the product is to first grind the powder in the mill and then introduce the required amount of the sodium thiosulfate solution into a known amount of the powder in a mixer. At the same time the solvent solution of resin is introduced into the mixture and the mixing process is then continued until the two solutions have thoroughly coated the surface of the particles. In experimental work conducted on this product, it has been found that the sodium thiosulfate solution is best incorporated in the proportion of 300 cc. of solution to 10 pounds of powder and the resin solution in the proportion of 100 cc. of solution to 10 pounds of powder. These two proportions give extraordinarily good coverage and effective distribution of the surface treating reagents over the surface of the powders.

The powder is then dried subsequent to the mixing procedure to remove the excess solvent and water. The mixing procedure produces a product having the lowest oil absorption and the highest degree of plasticity.

In referring to the use of heavy bodied blown or heat-treated oils in the treatment of limestone to improve its physical properties and thereby impart improved physical properties to putty, I have found that by following the teachings of my invention the requirements of the amount of oil necessary to form a highly desirable putty product are greatly reduced. Such oils as heavy bodied heat-treated linseed oils, heavy bodied blown linseed oils, heavy bodied blown soya oils, heavy bodied heat-treated soya oils, heavy bodied blown fish oils, and heavy bodied heat-treated fish oils can be used in treating the powder to improve its properties. As a matter of fact, all classes of drying oils that are capable of being bodied into heavy viscous flow by either blowing or heat treatment, can suitably be used in accordance with the teachings of the present invention. These oils can be introduced into contact with the powder in any suitable manner including their emulsified forms as well as in solutions such as a naphtha solution. I have found that with respect to the quantities of oil utilized in treating the powder, the critical range runs from 0.05% up to 5.0% by weight of the limestone and the preferred amounts are within a range of from 0.2% to 0.5% by weight of the limestone. This small amount of oil is introduced as a film on the surface of the limestone particles during grinding. As the powder lies in storage a short time, this layer of adsorbed heavy bodied oil becomes much more wettable and highly adhesive than ordinary untreated oils. I have discovered that powders treated in this manner will build a type of structure exhibiting a high degree of plasticity, and a high degree of suspension results without the use of formulation requiring from 20% to 40% of heavy bodied oils in the formulation of putty.

One of the embodiments of my invention is a process by which the heavy bodied oils are placed in a solution, either a solvent such as naphtha or in a water emulsion and metered into the mill during the process of grinding in the same manner as described in connection with sodium thiosulfate and rosin. The optimum effect is produced at the range of about 0.5% of the heavy bodied oil in relationship to the powder. In other words, 0.5% is 10 pounds of heavy bodied oil per ton of powder, or 0.1% is 2 pounds of heavy bodied oil per ton of powder. These quantities are extremely small in comparison to what would be used in a vehicle formula containing 20% to 40% of the heavy bodied oil. It has been found that almost the same degree of plasticity can be developed by introducing an extremely small quantity of the heavy bodied oils onto the powder during the process of grinding in the manner shown in Fig. 2.

Table VI lists five examples in which crystalline powders treated by the method just described have been made into putty, using raw linseed oil as the vehicle.

Table VI

| Exp. No. | Surface Treatment | Percent | Oil Abs. | Putty Properties, Plastic Flow and Suspension |
|---|---|---|---|---|
| TS-1A | None | | 12.70 | Short and mealy, low adhesion, oil separates, poor keeping. |
| TS-49F | Heavy Bodied Linseed Oil, Heat bodied Z-4 in Naphtha. | 1.0 | 12.60 | No oil separation on standing. Set up, required reworking. Medium long flow, medium high adhesion. |
| TS-50E | Heavy Bodied Linseed Oil, Heat bodied Z-4 in Emulsion. | 0.2 | 11.42 | Excellent condition after standing, does not require reworking. Medium long flow, dense body, medium high adhesion. |
| TS-50H | Heavy Bodied Linseed Oil, Heat bodied Z-4 in Emulsion. | 0.5 | 11.45 | Excellent condition, same as when put in can. Long flow, dense body, high adhesion. |
| TS-53B | Fish Oil, Blown-Z-4 in Emulsion | 0.2 | 11.54 | Moderate oil separation, rather hard condition. Medium long flow, medium dense body, medium adhesion. |
| TS-55B | Fish Oil, Blown-Z-4 in Naphtha | 0.5 | 12.63 | Moderate oil separation, rather hard condition. Medium long flow, medium dense, medium adhesion. |
| TS-23B | Benzoic Acid | 0.2 | 12.16 | Moderate keeping, some oil separation, no hardening. Medium short, dense body, medium adhesion. |

Notice that No. TS-1A, which is the untreated powder, gave a product having an oil absorption of 12.70, was short and mealy giving a low degree of oil adhesion and that the oil separated on standing. In every other case where the powder was treated with the heavy bodied oil, either in naphtha or in emulsion, a much higher degree of plastic flow was developed. In fact the particular surface treatment that gave the best results in these experiments was the equal of any product that could be produced from either oolitic limestone or chalks or the very fine grinding of crystalline limestones. The products containing the treated powders possess a high degree of plastic flow, good adhesion, and extraordinarily good keeping qualities in the can.

An example of the remaining reagent or method of treatment is also given in Table VI. It is experiment TS-23B, in which benzoic acid was used in the form of an emulsion. This reagent, when applied in emulsion form or in solvent solution, very considerably alters the physical properties of the resultant treated limestone, improving its keeping quality and improving its body and adhesion. It produces a powder having somewhat different characteristics than that produced from treatment with the heavy bodied oils. In many applications in the industrial arts of this category of compounds, powders are often required that have a good dense body and a high degree of adhesion and a short plastic flow. This is rather difficult to develop except with treated powders or by careful selection of special vehicles.

The benzoic acid is introduced into the mill onto the rock in exactly the same manner as described for all of the other methods of treatment. That is, it is placed in either solvent solution or in an emulsion and metered into the mill during the process of grinding. The benzoic acid can be used in quantities of from 0.1% to 5.0% by weight of the limestone. It has been found that the preferred range is from 0.2% to 0.5% by weight of the limestone.

I have found that by a combination of two or more of the disclosed reagents that highly modified powders can be produced and that there is a synergistic action between the different methods of treatment, i.e., the one will often enhance or greatly increase the properties of the other. This is an unusual phenomenon and is one not frequently encountered in the application of treating reagents of various kinds in the industrial arts.

Obviously many modifications and variations of the invention as hereinbefore set forth may be made without departing from the spirit and scope thereof, and therefore only such limitations should be imposed as are indicated in the appended claims.

I claim:

1. A putty composition which exhibits a high degree of plastic flow, cohesion and adhesion with minimized combined oil vehicle requirements, said composition consisting essentially of a treated pulverized limestone powder and a drying oil vehicle in proportions yielding a putty-like consistency, the powder particles being provided with surface coatings of a heavy-bodied and highly viscous drying oil applied to the particle surfaces prior to putty composition formation, the surface coatings ranging from 0.05% to 5.0% by weight of the powder.

2. A putty composition which exhibits a high degree of plastic flow, cohesion and adhesion with minimized combined oil vehicle requirements, said composition consisting essentially of a treated pulverized limestone powder and a drying oil vehicle in proportions yielding a putty-like consistency, the powder particles being provided with surface coatings of a heavy-bodied and highly viscous drying oil applied to the particle surfaces prior to putty composition formulation, the surface coatings ranging from 0.05% to 5.0% by weight of the powder, the drying oil vehicle being formed at least substantially from a straight putty oil with any heavy-bodied and highly viscous drying oil content thereof being no greater than 20%.

3. A putty composition which exhibits a high degree of plastic flow, cohesion and adhesion with minimized combined oil vehicle requirements, said composition consisting essentially of a treated pulverized limestone powder and a drying oil vehicle in proportions yielding a putty-like consistency, the powder particles being provided with surface coatings of a heavy-bodied and highly viscous drying oil applied to the particle surfaces prior to putty composition formulation, the surface coatings ranging from 0.05% to 5.0% by weight of the powder, the treated powder providing for a reduction in drying oil vehicle absorption of from about 5% to 25% by weight of the vehicle.

4. The method of preparing limestone for use as a powder base in putty formulation, said method comprising pulverizing limestone rock under particle-size reduction conditions, and metering onto said rock during pulverization thereof quantities of a heavy-bodied and highly viscous drying oil ranging from 0.05% to 5.0% by weight of the limestone, the treating oil as metered onto the rock being in liquidized form by combination with a vaporizable liquid.

5. The method of claim 4 wherein said vaporizable liquid is an emulsifying agent.

6. The method of claim 4 wherein said vaporizable liquid is a solvent.

7. The method of preparing a putty composition, said method comprising pulverizing limestone rock under particle-size reduction conditions, metering onto said rock during pulverization thereof quantities of a heavy-bodied and highly viscous drying oil ranging from 0.05% to 5.0% by weight of the limestone, the treating oil as metered onto the rock being in liquidized form by combination with a vaporizable liquid, and combining the treated powder with a drying oil vehicle in proportions yielding a putty-like consistency.

References Cited in the file of this patent

UNITED STATES PATENTS

| | | |
|---|---|---|
| 644,766 | Gleichmar | Mar. 6, 1900 |
| 1,503,422 | Laurila | July 29, 1924 |
| 2,187,130 | Lightbody | Jan. 16, 1940 |
| 2,232,164 | Carter | Feb. 18, 1941 |
| 2,274,521 | Berry | Feb. 24, 1942 |
| 2,290,914 | Machlin | July 28, 1942 |
| 2,663,695 | Perloff et al. | Dec. 22, 1953 |
| 2,668,749 | McHan | Feb. 9, 1954 |

FOREIGN PATENTS

| | | |
|---|---|---|
| 3,886 | Great Britain | of 1893 |
| 426,739 | Great Britain | Apr. 9, 1935 |